(12) United States Patent
Rehak et al.

(10) Patent No.: US 12,375,505 B2
(45) Date of Patent: Jul. 29, 2025

(54) ENDPOINT-ASSISTED INSPECTION OF ENCRYPTED NETWORK TRAFFIC

(71) Applicant: Cisco Technology, Inc., San Jose, MA (US)

(72) Inventors: Martin Rehak, Prague (CZ); David McGrew, Poolesville, MD (US); Blake Harrell Anderson, Chapel Hill, NC (US); Scott William Dunlop, Des Moines, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/416,439

(22) Filed: Jan. 18, 2024

(65) Prior Publication Data
US 2024/0154979 A1    May 9, 2024

Related U.S. Application Data

(63) Continuation of application No. 17/722,131, filed on Apr. 15, 2022, now Pat. No. 11,916,932, which is a
(Continued)

(51) Int. Cl.
*H04L 9/40* (2022.01)

(52) U.S. Cl.
CPC .......... *H04L 63/1416* (2013.01); *H04L 63/02* (2013.01); *H04L 63/0428* (2013.01);
(Continued)

(58) Field of Classification Search
CPC . H04L 63/1416; H04L 63/20; H04L 63/1441; H04L 63/1425; H04L 63/0428; H04L 63/02; H04L 63/166; H04L 63/029
See application file for complete search history.

(56) References Cited

U.S. PATENT DOCUMENTS 8,856,910 B1   10/2014   Rostami-Hesarsorkh et al.
9,203,931 B1   12/2015   Ngo et al.
(Continued)

FOREIGN PATENT DOCUMENTS

JP    2017068677 A    4/2017

OTHER PUBLICATIONS

European Search Report for European Application No. 19746257.5, mailed Jan. 13, 2022, 5 Pages.
(Continued)

*Primary Examiner* — Michael R Vaughan
(74) *Attorney, Agent, or Firm* — BEHMKE INNOVATION GROUP LLC; James M. Behmke

(57) ABSTRACT

In one embodiment, a traffic inspection service executed by an intermediary device obtains, from a monitoring agent executed by an endpoint device, keying information for an encrypted traffic session between the endpoint device and a remote entity. The traffic inspection service provides a notification to the monitoring agent that acknowledges receipt of the keying information. The traffic inspection service uses the keying information to decrypt encrypted traffic from the encrypted traffic session. The traffic inspection service applies a policy to the encrypted traffic session between the endpoint device and the remote entity, based on the decrypted traffic from the session.

20 Claims, 10 Drawing Sheets

Related U.S. Application Data continuation of application No. 16/100,361, filed on Aug. 10, 2018, now Pat. No. 11,310,246.

(52) U.S. Cl.
CPC ...... *H04L 63/1425* (2013.01); *H04L 63/1441* (2013.01); *H04L 63/20* (2013.01); *H04L 63/166* (2013.01)

(56) References Cited

U.S. PATENT DOCUMENTS

| | | | |
|---|---|---|---|
| 9,338,147 | B1 | 5/2016 | Rothstein et al. |
| 9,843,593 | B2 | 12/2017 | Rostami-Hesarsorkh et al. |
| 9,967,292 | B1 | 5/2018 | Higgins et al. |
| 2003/0128695 | A1 | 7/2003 | Park |
| 2003/0191963 | A1 | 10/2003 | Balissat et al. |
| 2005/0251859 | A1 | 11/2005 | Quittek et al. |
| 2010/0158009 | A1 | 6/2010 | Lee et al. |
| 2014/0115702 | A1 | 4/2014 | Li et al. |
| 2015/0312267 | A1 | 10/2015 | Thomas |
| 2016/0309331 | A1 | 10/2016 | Moon |
| 2017/0289109 | A1 | 10/2017 | Caragea |
| 2018/0026986 | A1 | 1/2018 | Nanjo et al. |
| 2019/0068561 | A1 | 2/2019 | Caragea |
| 2019/0327347 | A1* | 10/2019 | Galloway ............... H04L 69/16 |
| 2019/0349403 | A1 | 11/2019 | Anderson et al. |

OTHER PUBLICATIONS

Han J., et al., "SGX-Box: Enabling Visibility on Encrypted Traffic using a Secure Middlebox Module," Association for Computing Machinery, Aug. 3-4, 2017, 7 Pages.

International Preliminary Report on Patentability for International Application No. PCT/US2019/041372, mailed Feb. 25, 2021, 8 Pages.

International Search Report and Written Opinion for International Application No. PCT/US2019/041372, mailed Sep. 25, 2019, 9 Pages.

Mahy R., et al., "Traversal Using Relays around NAT (TURN): Relay Extensions to Session Traversal Utilities for NAT (STUN)," Internet Engineering Task Force, Request for Comments: 5766, The IETF Trust, Apr. 2010, pp. 1-67.

Radivilova T., et al., "Decrypting Ssl/tls Traffic for Hidden Threats Detection," 2018 IEEE 9th International Conference on Dependable Systems, Services and Technologies, DESSERT, Kyiv, May 24-27, UKraine, 2018, pp. 143-146.

Reddy T., et al., "Session Traversal Utilities for NAT (STUN) Extension for Third-Party Authorization," Internet Engineering Task Force (IETF), Aug. 2015, pp. 1-25.

Rosenberg J., et al., "Sesssion Traversal Utilities for NAT (STUN)," Network Working Group, Request for Comments: 5389, The IETF Trust, Oct. 2008, 51 Pages.

Schiff L., et al., "PRI: Privacy Preserving Inspection of Encrypted Network Traffic", arXiv: 1604.04465v1 [cs.CR] Apr. 15, 2016, 9 Pages.

Shaver J., "Decrypting TLS Browser Traffic With Wireshark—The Easy Way!," Feb. 11, 2015, pp. 1-31, Retrieved from URL: https://jimshaver.net/2015/02/11/decrypting-tls-browser-traffic-with-wire.

* cited by examiner

ENDPOINT-ASSISTED INSPECTION OF ENCRYPTED NETWORK TRAFFIC

RELATED APPLICATION

This application is a continuation of U.S. patent application Ser. No. 17/722,131, filed on Apr. 15, 2022, which is a continuation of U.S. patent application Ser. No. 16/100,361, filed on Aug. 10, 2018, both entitled ENDPOINT-ASSISTED INSPECTION OF ENCRYPTED NETWORK TRAFFIC, by Rehak et al., the entire contents of which are incorporated by reference herein.

TECHNICAL FIELD

The present disclosure relates generally to computer networks, and, more particularly, to endpoint-assisted inspection of encrypted network traffic.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic.

Beyond the various types of legitimate application traffic in a network, some network traffic may also be malicious. For example, some traffic may seek to exfiltrate sensitive information from a network, such as credit card numbers, trade secrets, and the like. Further types of malicious network traffic include network traffic that propagate the malware itself and network traffic that passes control commands to already infected devices, such as in the case of a distributed denial of service (DDoS) attack.

Inspection of network traffic is relatively straight-forward, when the network traffic is unencrypted. For example, techniques such as deep packet inspection (DPI), allows a networking device to inspect the payloads of packets and identify the contents of the packets. However, the use of traffic encryption is becoming increasingly ubiquitous Many instances of malware now use encryption, to conceal their network activity from detection. Beyond even the case of malware infection, the use of encrypted web traffic is becoming increasingly ubiquitous, making techniques such as DPI unable to identify threats and prevent sensitive data from being communicated elsewhere.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
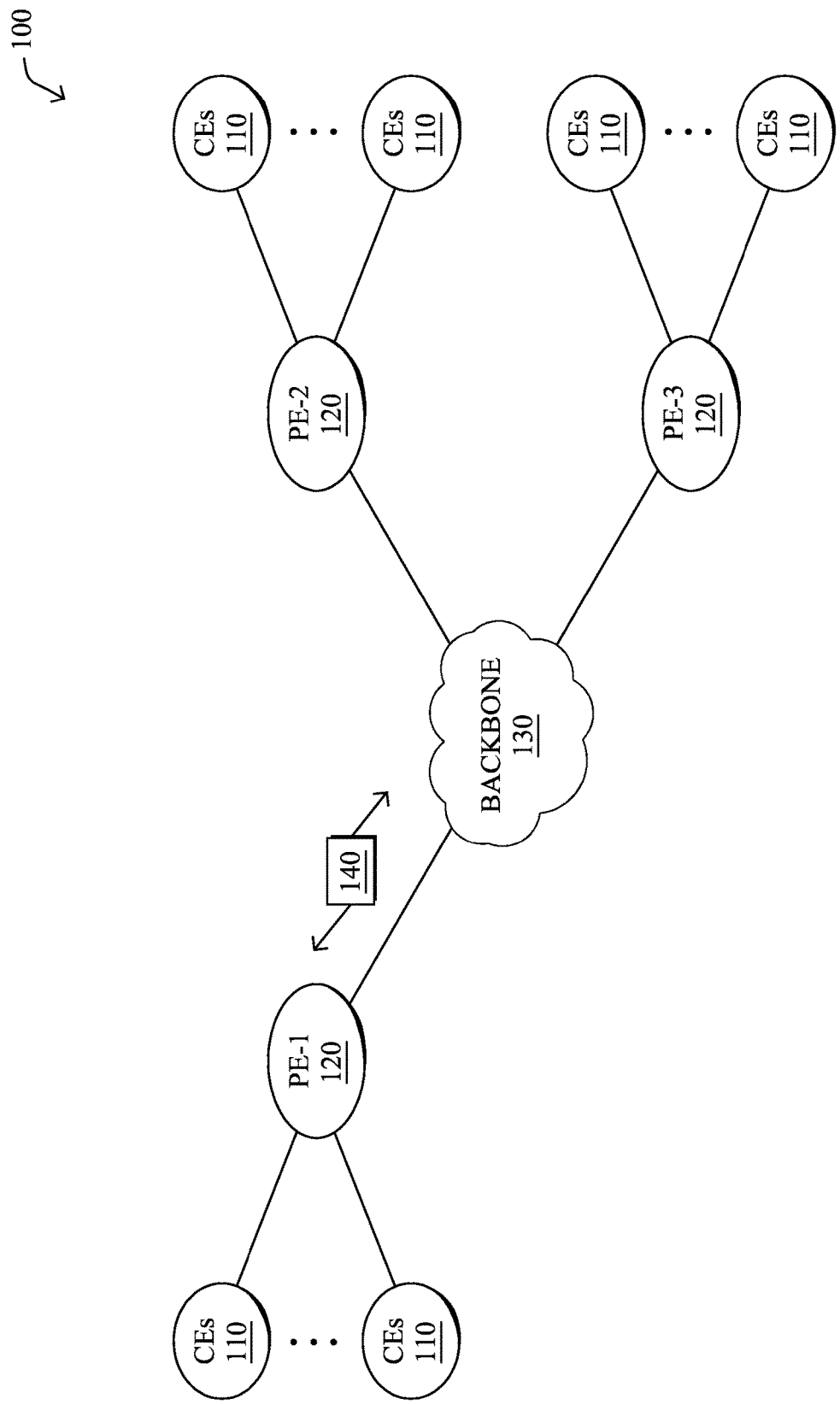
FIGS. 1A-1B illustrate an example communication network.

According to one or more embodiments of the disclosure, a traffic inspection service executed by an intermediary device obtains, from a monitoring agent executed by an endpoint device, keying information for an encrypted traffic session between the endpoint device and a remote entity. The traffic inspection service provides a notification to the monitoring agent that acknowledges receipt of the keying information. The traffic inspection service uses the keying information to decrypt encrypted traffic from the encrypted traffic session. The traffic inspection service applies a policy to the encrypted traffic session between the endpoint device and the remote entity, based on the decrypted traffic from the session.

In further embodiments, a monitoring agent of a device detects a handshake between the device and a remote entity to form an encrypted traffic session. The monitoring agent captures keying information for the session from the handshake. The monitoring agent provides the captured keying information to a traffic inspection service. The traffic inspection service uses the keying information to decrypt encrypted traffic from the encrypted traffic session and applies a policy to the traffic session based on the decrypted traffic. The monitoring agent delays providing of the encrypted traffic from the device to the remote entity, until the traffic inspection service acknowledges receipt of the provided keying information.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
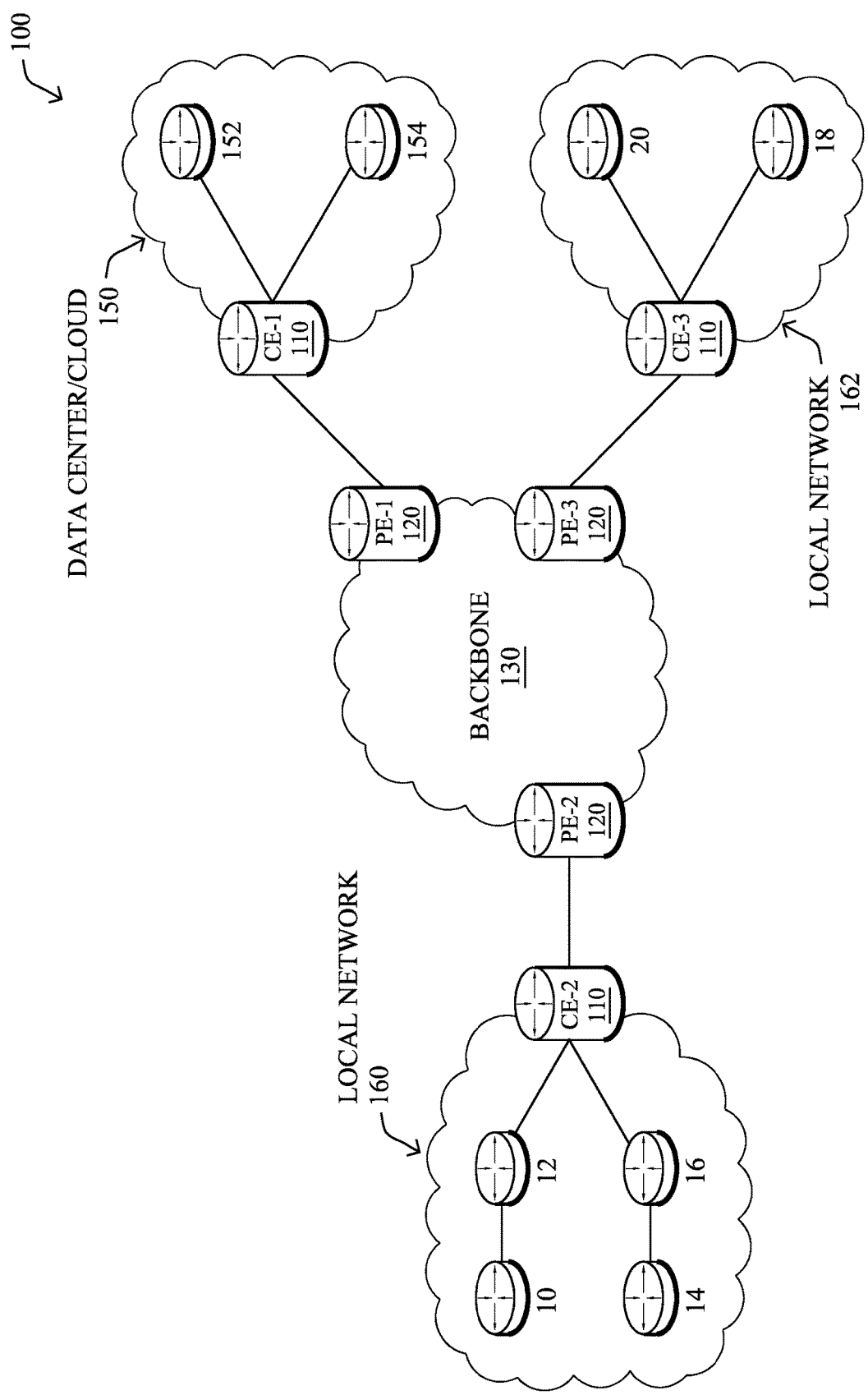

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
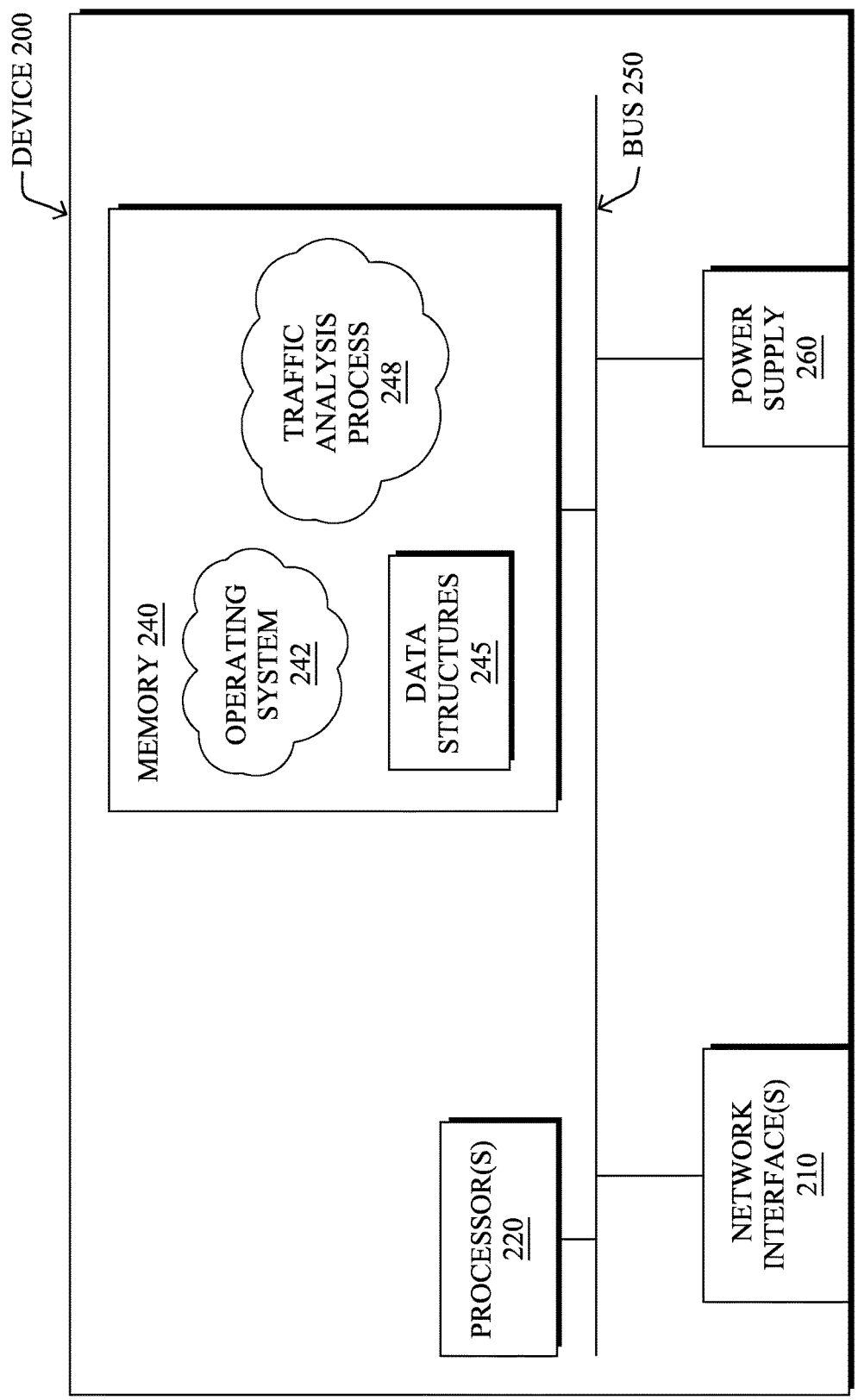
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, traffic analysis process 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis process 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
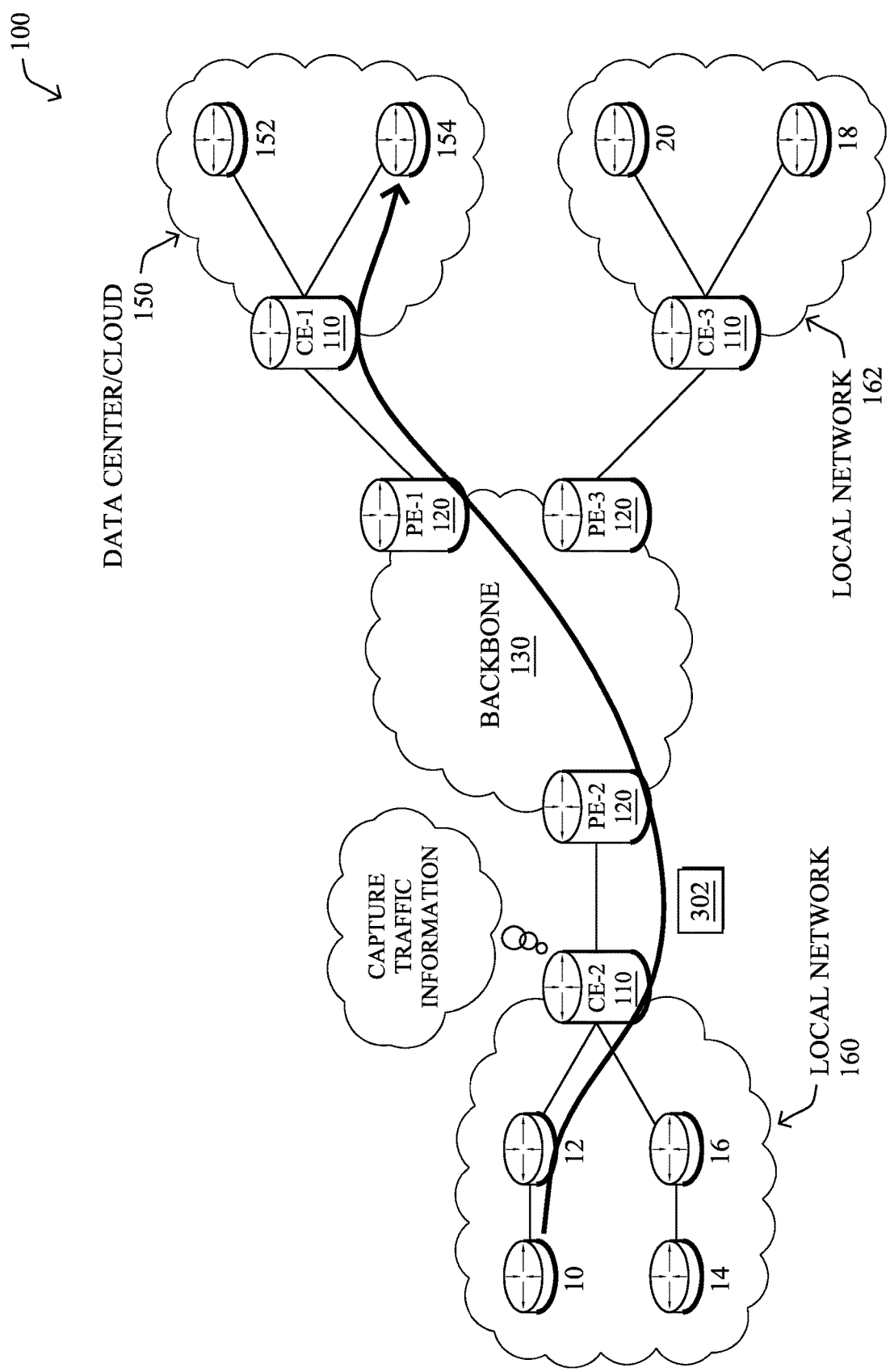
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, encrypted network traffic can be used to conceal the spread of malware infections, malware command and control (C&C) signaling, data exfiltration, and other malicious activities. Notably, encryption protects the packet payloads from being inspected by techniques such as DPI, making it difficult to distinguish between benign traffic and malicious traffic.

One approach to dealing with the potential threat of encrypted traffic is to perform man-in-the-middle traffic inspection. Under this approach, an intermediate proxy between the communicating endpoints essentially acts as each endpoint from the standpoint of the other. More specifically, when one endpoint requests a secure connection with another endpoint, the proxy captures this request and sends its own request on to the other endpoint. In doing so, each endpoint essentially thinks that it is communicating securely with the other endpoint, but is actually communicating instead with the proxy. This allows the proxy to decrypt the traffic and perform packet inspection on the traffic.

A man-in-the-middle proxy approach is not viable in all circumstances. Indeed, there are privacy considerations that may prevent the decryption of all encrypted traffic. Moreover, man-in-the-middle inspection of encrypted traffic becomes very hard with TLS 1.3, as the use of Diffie-Hellmann authenticated handshakes prevents the inspection for legitimate and malicious content alike. While this provides end-to-end confidentiality and integrity protection, it also prevents any effective security inspection of the content.

Endpoint-Assisted Inspection of Encrypted Network Traffic

The techniques herein allow for the inspection of encrypted network traffic, including traffic that leverages Diffie-Hellman handshake-generated keying information, such as in TLS 1.3. In some aspects, the techniques herein interface endpoint security software (e.g., a monitoring agent) with an intermediary traffic inspection service, such as a network-based firewall. During operation, the endpoint software obtains the session encryption keys used by the communicating process and provides them to the traffic inspection service. In turn, the service is able to decrypt the traffic and inspect the contents of the communication, without having to resort to a man-in-the-middle approach.

Specifically, according to one or more embodiments of the disclosure as described in detail below, a traffic inspection service executed by an intermediary device obtains, from a monitoring agent executed by an endpoint device, keying information for an encrypted traffic session between the endpoint device and a remote entity. The traffic inspection service provides a notification to the monitoring agent that acknowledges receipt of the keying information. The traffic inspection service uses the keying information to decrypt encrypted traffic from the encrypted traffic session. The traffic inspection service applies a policy to the encrypted traffic session between the endpoint device and the remote entity, based on the decrypted traffic from the session.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Operationally, the techniques herein combine an endpoint security program/monitoring agent and an intermediary traffic inspection service (e.g., a firewall service, etc.), whereby the endpoint agent retrieves the symmetric encryption keys from the process on the endpoint device that opens the secure connection with a remote entity, communicates them to the intermediate firewall and the firewall uses the keys to inspect the content of the traffic encrypted by the keys.

FIGS. 4A-4D illustrate an example 400 of endpoint-assisted inspection of encrypted network traffic, according to various embodiments. As shown, assume that there is an endpoint device 402 and a remote entity 406 that are connected via any number of networks (e.g., local networks, the Internet, etc.). Endpoint device 402 may be a mobile device, laptop or desktop computer, wearable device, IoT node, or any other device capable of communicating via a network. Conversely, remote entity 406 may be another such device, a server, a cloud-based service, or the like.

Situated along the communication path between endpoint device 402 and remote entity 406 may be one or more intermediary devices that implement a traffic inspection service 404 such as a traditional firewall, next generation firewall, intrusion detection system (IDS), or the like. For example, in some implementations, traffic inspection service 404 may be located at an edge of a local network that also includes endpoint device 402, thereby allowing traffic inspection service 404 to inspect any traffic flowing into, or out of, the local network.

In various embodiments, a key component of the techniques herein is a monitoring agent 410 that is executed by endpoint device 402. Such a monitoring agent may be based on an existing endpoint security product, such as Cisco's Advanced Malware Protection (AMP), other security products, or may be a custom agent specifically designed to perform the techniques herein. Depending on the configuration of monitoring agent 410, it may monitor the files, processes/applications, various memory spaces, and/or process trees of endpoint device 402. For example, in some embodiments, monitoring agent 410 may leverage this information to determine whether a given file, process, or process tree is suspected of being malicious. In further embodiments, monitoring agent 410 may not make these types of security assessments, but may simply be an agent on endpoint device 402 that monitors the health or resource consumption of endpoint device 402.

During operation, monitoring agent 410 may use its root-level privileges to retrieve the (ephemeral) symmetric encryption keys used by the communicating process to encode the content of the communication over a secure connection (e.g., TLS, SSH, etc.). For example, assume that application 408 on endpoint device 402 initiates a handshake between endpoint device 402 and remote entity 406 to form an encrypted traffic session via key exchange 412. In such cases, monitoring agent 410 will retrieve the keying information from key exchange 412 when they are available (e.g., after completion of the Diffie-Hellman handshake that happens upon the connection setup). Note that the keying information may not be directly stored in the memory space of the communicating process, such as application 408, but may be stored within another process or dedicated system process (e.g. lsass, etc.), in further embodiments. The principle would still remain the same, though, and monitoring agent 410 may retrieve the keying information from the corresponding memory space of endpoint device 402, as appropriate.

According to various embodiments, monitoring agent 410 may only capture the keying information, or may only send the captured keying information, under certain circumstances. These circumstances may include, but are not limited to, any or all of the following:

Monitoring agent 410 suspects the process involved in the secure session of being malicious.

Monitoring agent 410 suspects the process tree involved in the secure session of being malicious.

Monitoring agent 410 suspects that a file involved in the secure session of being malicious or protected by privacy policy (e.g., the file includes personally identifiable information, etc.).

Even if monitoring agent 410 determines that the process/application is legitimate (e.g., a browser, etc.), monitoring agent 410 determines that there is a risk of malicious code, a protected document, or the like, being transmitted.

In some cases, monitoring agent 410 may make a maliciousness determination regarding a process, process tree, or file, directly. For example, monitoring agent 410 may include malware detection or privacy protection rules that are executed directly on endpoint device 402. In other embodiments, however, the maliciousness determination may be made instead by traffic inspection service 404, such as based on the identity of endpoint device 402 or remote entity 406, characteristics of the traffic between the two, etc. In such cases, traffic inspection service 404 may signal this determination back to monitoring agent 410, thereby causing monitoring agent 410 to capture to keying information from exchange 412. Similarly, traffic inspection service 404 may request keying information from monitoring agent 410 at any time, such as periodically or to assess samples of encrypted traffic associated with endpoint device 402.

Figure 4A:
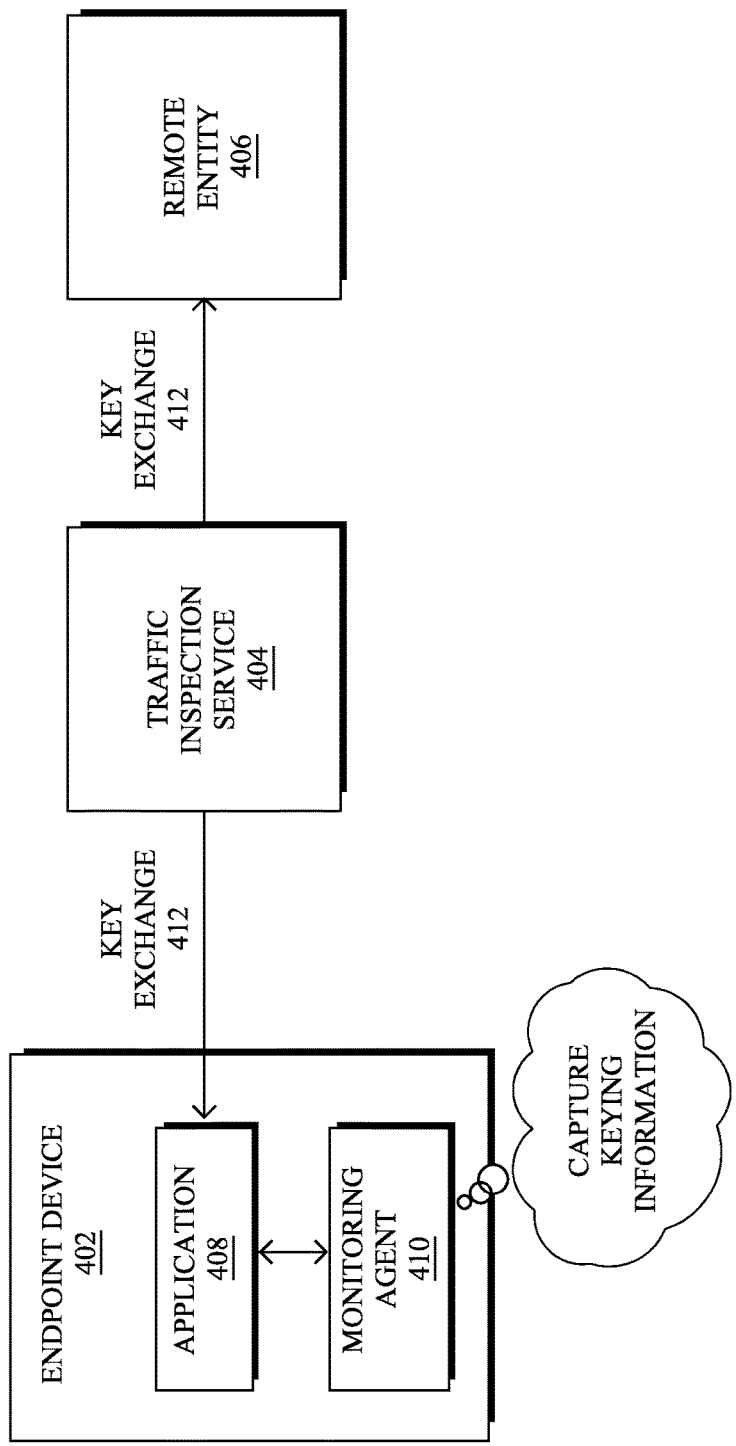
FIGS. 4A-4D illustrate an example of endpoint-assisted inspection of encrypted network traffic.
Figure 4B:
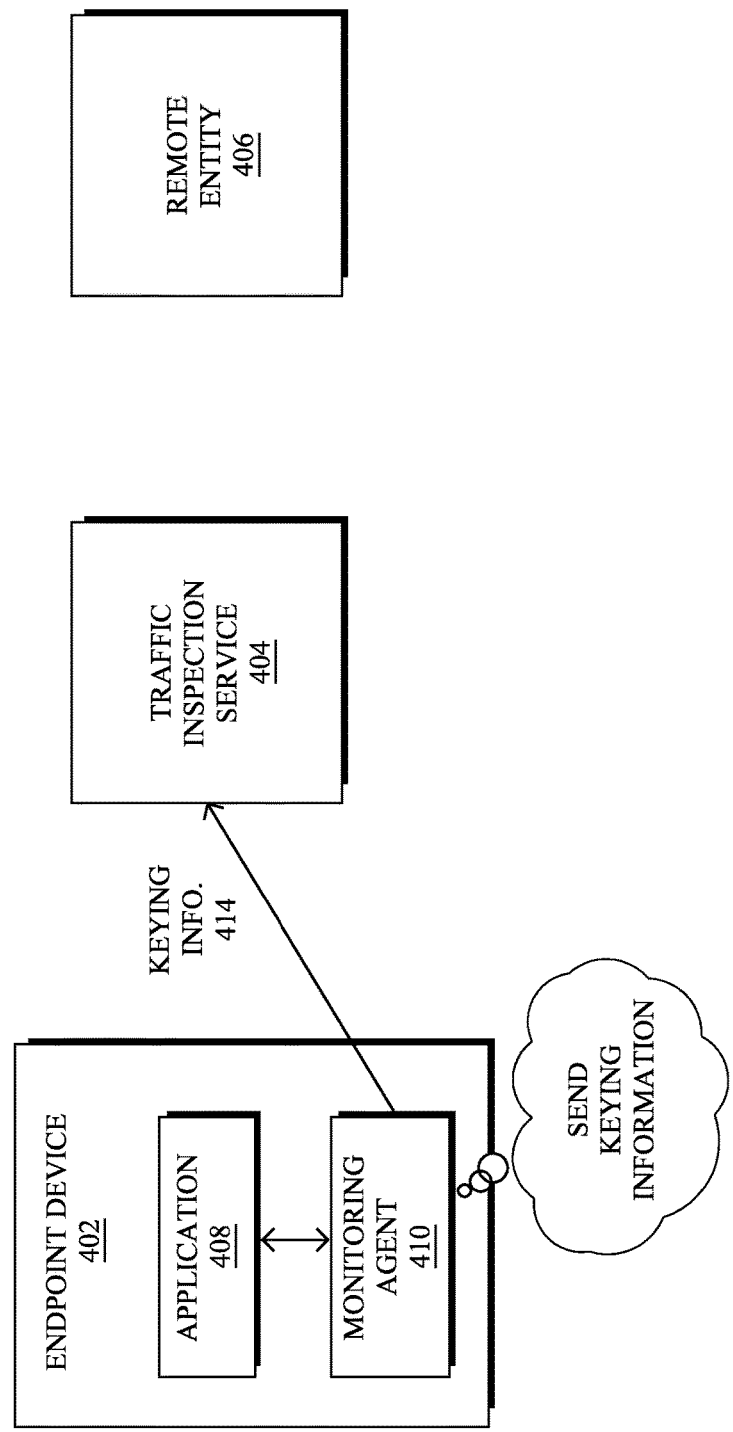

As shown in FIG. 4B, after capturing the keying information from the key exchange 412, monitoring agent 410 may send the captured keying information 414 to traffic inspection service 404. In addition, in some embodiments, monitoring agent 410 may inform traffic inspection service 404 about the source IP address and TCP port number, and destination IP/port, used by the secure connection. The initialization vector may either be transported with keying information 414 or obtained by traffic inspection service 404 directly.

To protect keying information 414 during transit, mutual authentication between endpoint device 402 and traffic inspection service 404 may be used. In some cases, the mutual authentication may be cloud-driven, but the session keys/keying information 414 obtained by monitoring agent 410 must not go to the cloud. Or, if keying information 414 transits through the cloud, it may do so through an encrypted channel with keys of this channel not accessible to the cloud. In other words, keying information 414 must be protected inside a secure channel between endpoint device 402 and traffic inspection service 404 (e.g., firewall, proxy, IDS, etc.).

Figure 4C:
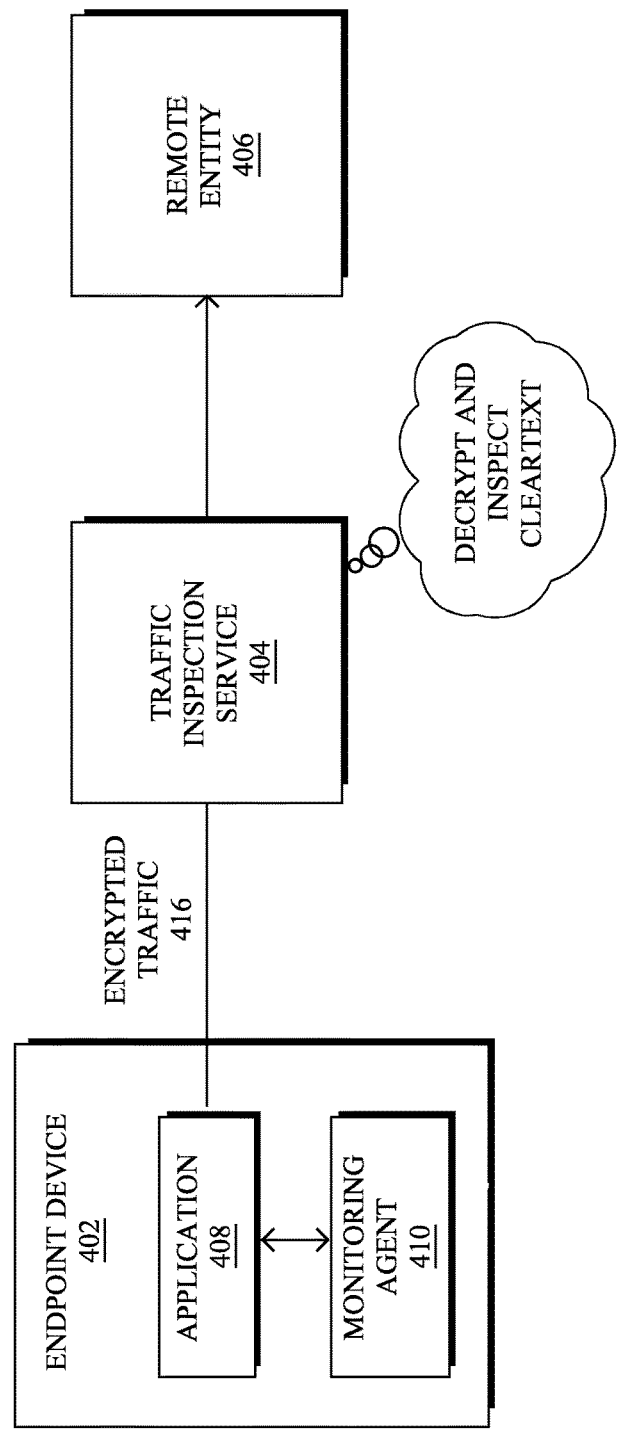
Figure 4D:
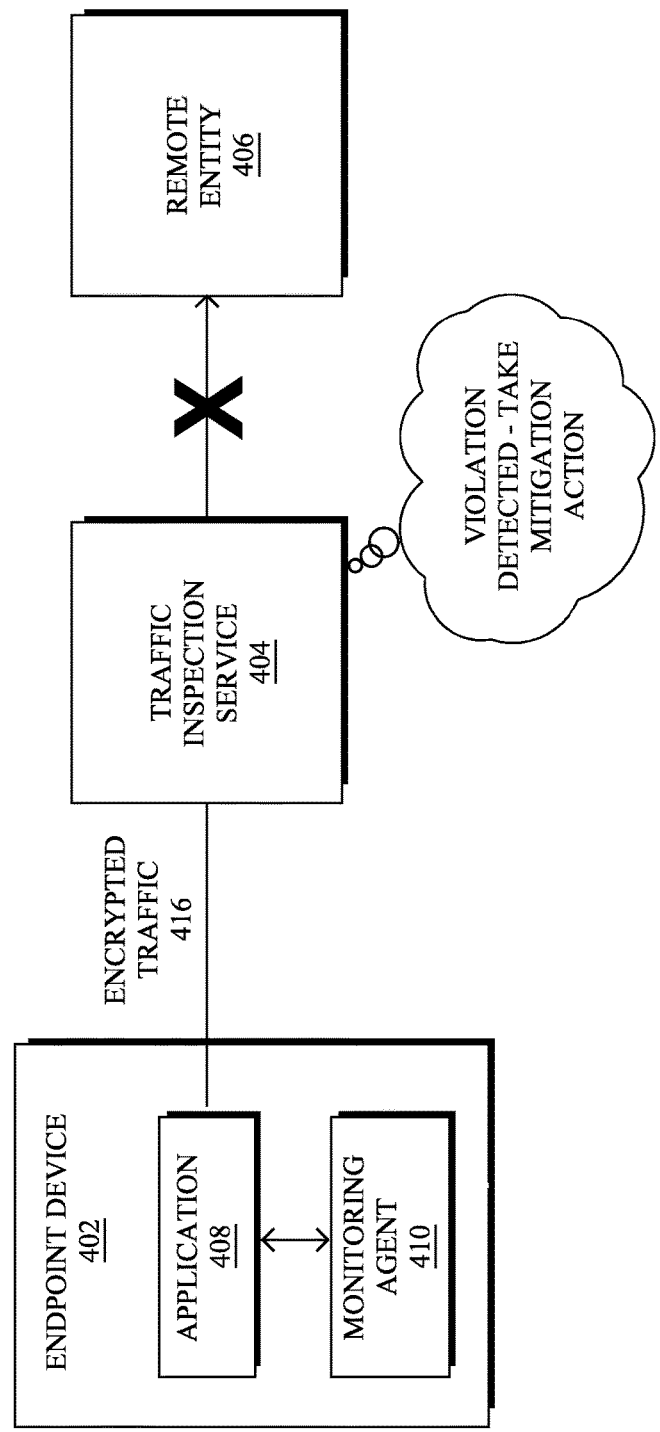

As shown in FIG. 4C, assume now that application 408 uses the keying information from its exchange with remote entity 408 to send encrypted traffic 416 to remote entity 406. Since traffic inspection service 404 also has this keying information, it is able to decrypt and inspect the cleartext of encrypted traffic 416. In some cases, the inspection may be performed on-premises with endpoint device 402. For example, traffic inspection service 404 may be a local service in the same local network as endpoint device 402 (e.g., service 404 may be a firewall, IDS, IDS/firewall combination, on-premises proxy, or the like). In other cases, the inspection may be performed in the cloud (e.g., service 404 may be a cloud-based firewall or cloud-based proxy).

Traffic inspection service 404 may apply any number of inspection rules to the cleartext of the decrypted traffic 416. For example, service 404 may apply a set of IDS rules to the cleartext and/or header information of traffic 416, to determine whether traffic 416 is malicious or suspected of being malicious. In another embodiment, service 404 may apply a privacy policy to the decrypted traffic 416. For example, if the cleartext includes personally identifiable information, a file that has been flagged as restricted, trade secret information, or the like, traffic inspection service 404 may similarly deem traffic 416 as a violation.

Note that the rules applied by traffic inspection service 404 to traffic 416 may be privacy-preserving (e.g., the rules must not leak arbitrary data about traffic unrelated to any attack). In some cases, traffic inspection service 416 may be configured so as not to allow a user to write specific rules with the intent to obtain specific information from a legitimate connection. In order to achieve this, service 404 may impose a restriction of only applying the rules written by a trusted third party (e.g., Cisco Talos, etc.) and not customer-specific rules. Traffic inspection service 404 may also store and use the keying information only in a protected enclave and guarantee that the decrypted plaintext of traffic 416 never leaves the protected enclave in any other form than the inspection results. Traffic inspection service 404 may also use morphisec memory protection, to make it impossible for other processes to retrieve the stored keys, in some embodiments.

In response to determining that traffic 416 has violated a security or privacy policy, traffic inspection service 404 may take any number of mitigation actions with respect to traffic 416. For example, in some cases, service 404 may cause traffic 416 to be dropped or rerouted, to effectively terminate the session between endpoint device 402 and remote entity 406. In further cases, traffic inspection service 404 may capture information about traffic 416 for purposes of sending an alert to a security expert, user of endpoint device 402, or another interested party. Captured traffic information about traffic 416 can also be used, in some cases, for purposes of training a machine learning model to assess network traffic.

To ensure that traffic inspection service 404 inspects all encrypted traffic, various approaches can be employed. In one embodiment, monitoring agent 410 on endpoint device 402 may delay the transmission of the first packet of encrypted traffic 416 until traffic inspection service 404 sends a notification back to monitoring agent 410 confirming receipt of keying information 414 by traffic inspection service 404. In further cases, the delay can be implemented directly as part of traffic inspection service 404, such as by dropping packets of encrypted traffic 416 until keying information 414 is received and relying on TCP retransmission to recover the packet. In further embodiments, traffic inspection service 404 may, by policy, block all encrypted traffic for which keying information has not been received by service 404 for any or all endpoint devices under its purview.

Figure 5:
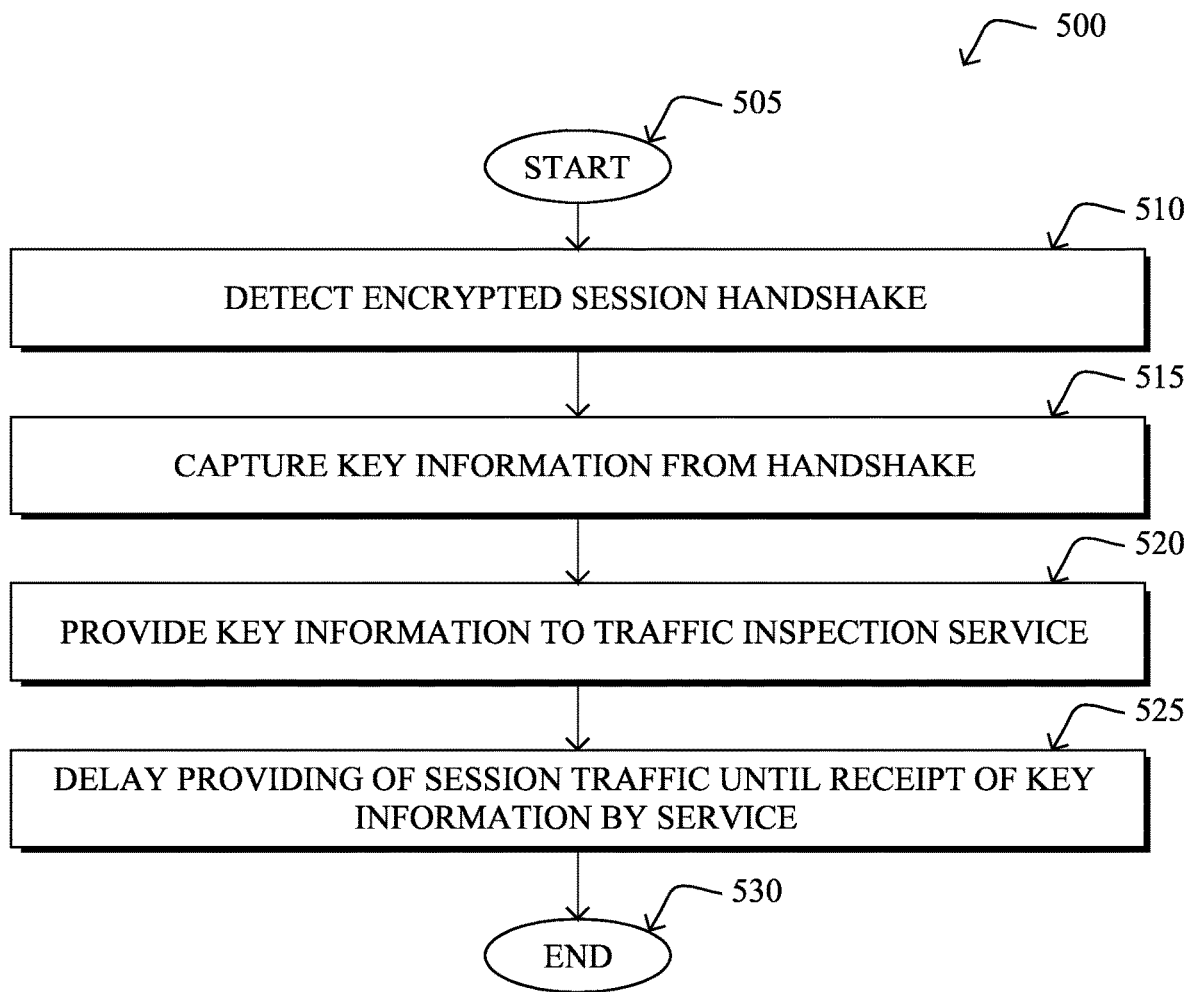
FIG. 5 illustrates an example simplified procedure for sending keying information to a traffic inspection service.

FIG. 5 illustrates an example simplified procedure for sending keying information to a traffic inspection service in a network, in accordance with one or more embodiments described herein. For example, a non-generic, specifically configured device may perform procedure 500 by executing stored instructions to execute a monitoring agent on the device. The procedure 500 may start at step 505, and continues to step 510, where, as described in greater detail above, the monitoring agent may detect a handshake between the device and a remote entity to form an encrypted traffic session. For example, the handshake may be a TLS 1.3 or higher handshake that uses Diffie-Hellman authentication.

At step 515, as detailed above, the monitoring agent may capture keying information for the session from the handshake. In various embodiments, the agent may obtain the keys from the memory space of the communicating application or, in some cases, of another dedicated system process (e.g., Isass, etc.) used to facilitate the handshake.

At step 520, the monitoring agent may provide the captured keying information to a traffic inspection service, as described in greater detail above. In various embodiments, the traffic inspection service uses the keying information to decrypt encrypted traffic from the encrypted traffic session and applies a policy to the traffic session based on the decrypted traffic. In some embodiments, the monitoring agent may only provide the keying information to the traffic inspection service, or only capture the keying information, if the process, process tree, and/or file associated with the traffic session.

At step 525, as detailed above, the monitoring agent may delay providing of the encrypted traffic from the device to the remote entity, until the traffic inspection service acknowledges receipt of the sent keying information. In other words, the agent may prevent the device from sending the encrypted traffic towards the remote entity until the inspection service is able to decrypt the traffic for inspection. Alternatively, the traffic inspection service may be configured to drop traffic unless it has already received the corresponding keying information for the traffic. Procedure 500 then ends at step 530.

Figure 6:
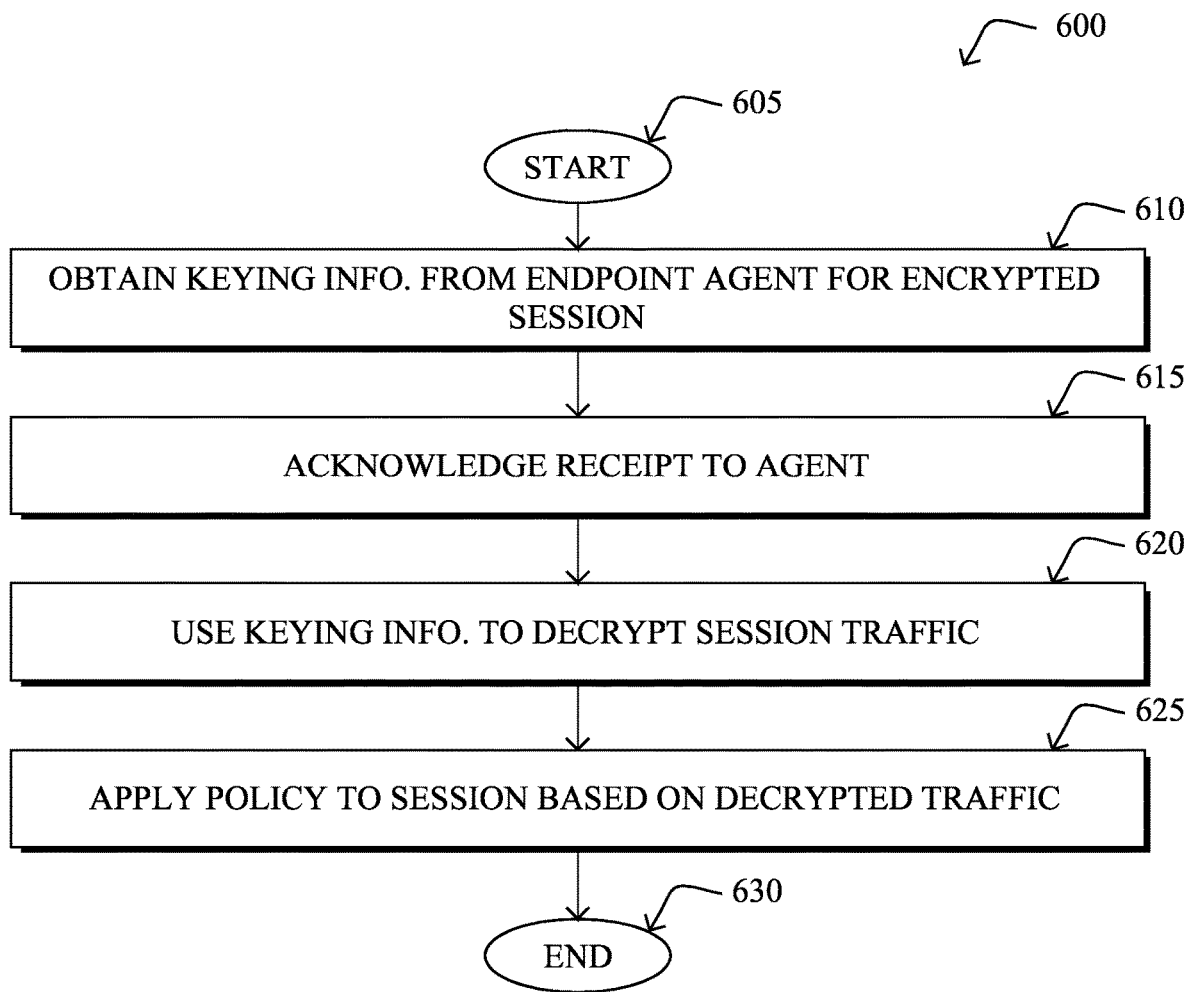
FIG. 6 illustrates an example simplified procedure for inspecting encrypted network traffic.

FIG. 6 illustrates an example simplified procedure for inspecting encrypted network traffic, in accordance with one or more embodiments described herein. For example, a non-generic, specifically configured device may perform procedure 600 by executing stored instructions to provide a traffic inspection service to the network. Notably, the device may be an intermediate device between an endpoint device and a remote entity. The procedure 600 may start at step 605, and continues to step 610, where, as described in greater detail above, the traffic inspection service may obtain, from a monitoring agent on the endpoint device, keying information for an encrypted traffic session between the endpoint device and a remote entity. Such a service may be, for example, a firewall, an IDS system, or any other form of traffic inspection service.

At step 615, as detailed above, the traffic inspection service may provide a notification to the monitoring agent that acknowledges receipt of the keying information. In some embodiments, the monitoring agent may be configured to prevent the endpoint device from sending packets via the encrypted traffic session until receipt of the keying information by the inspection service is acknowledged.

At step 620, the traffic inspection service may use the keying information to decrypt encrypted traffic from the encrypted traffic session, as described in greater detail above. In other words, the monitoring agent on the endpoint device may send the appropriate information to the traffic inspection service, to allow the service to decrypt the encrypted traffic of the session, thereby exposing the cleartext of the communication to the service.

At step 625, as detailed above, the traffic inspection service may apply a policy to the encrypted traffic session between the endpoint device and the remote entity, based on the decrypted traffic from the session. For example, the service may apply a security and/or data privacy policy to the traffic session, to determine whether the traffic is malicious (e.g., C&C traffic, malware propagation, etc.) and/or against privacy policy (e.g., conveys sensitive data, etc.). If a policy violation exists, the service may take any number of mitigation actions, such as blocking the session (e.g., dropping traffic from the encrypted session, etc.), generating alerts, or the like. Procedure 600 then ends at step 630.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, allow for the analysis of the contents of encrypted network traffic without having to employ a man-in-the-middle approach. In TLS 1.3, for example, such a man-in-the-middle approach is no long feasible due to the use of Diffie-Hellman handshake authentication.

While there have been shown and described illustrative embodiments that provide for endpoint-assisted inspection of encrypted network traffic, it is to be understood that various other adaptations and modifications may be made within the spirit and scope of the embodiments herein. For example, while certain embodiments are described herein with respect to using certain models for purposes of traffic analysis, the models are not limited as such and may be used for other functions, in other embodiments. In addition, while certain protocols are shown, such as TLS and SSH, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    obtaining, by a traffic inspection service executed by an intermediary device and from a monitoring agent executed by an endpoint device, keying information for an encrypted traffic session between the endpoint device and a remote entity, wherein the keying information a) comprises encryption keys exchanged between the endpoint device and the remote entity and b) is obtained, after the encrypted traffic session is formed, by the monitoring agent from a memory space of the endpoint device;
    providing, by the traffic inspection service, a notification that acknowledges receipt of the keying information to the monitoring agent, wherein transmission of packets via the encrypted traffic session by the endpoint is delayed by the traffic inspection service dropping the packets and relying on transmission control protocol retransmission to recover the packets;
    using, by the traffic inspection service, the keying information to decrypt encrypted traffic from the encrypted traffic session;
    applying, by the traffic inspection service and based on the decrypted traffic comprising a file from the session, a policy to the encrypted traffic session between the endpoint device and the remote entity to determine whether the decrypted traffic is malicious or against a policy; and
    performing, by the traffic inspection service, a mitigation action in response to a determination that the decrypted traffic is malicious or against the policy.

2. The method as in claim 1, wherein the encrypted traffic session is a Transport Layer Security (TLS) session.

3. The method as in claim 1, wherein the traffic inspection service is a firewall or intrusion detection system.

4. The method as in claim 1, wherein the policy comprises a security policy or a data privacy policy.

5. The method as in claim 1, wherein the transmission of packets via the encrypted traffic session by the endpoint device is further delayed by the monitoring agent until the monitoring agent receives the notification that acknowledges receipt of the keying information.

6. The method as in claim 1, further comprising:
    blocking, by the traffic inspection service, all encrypted traffic associated with the endpoint device for which the traffic inspection service did not receive keying information from the monitoring agent.

7. The method as in claim 1, wherein the mitigation action comprises at least one of: blocking the encrypted traffic session, rerouting the encrypted traffic session, and generating an alert.

8. The method as in claim 1, wherein the monitoring agent uses its root-level privileges at the endpoint device to access the memory space of the endpoint device.

9. The method as in claim 8, wherein the monitoring agent detects a handshake between the endpoint device and the remote entity that forms the encrypted traffic session, and the monitoring agent obtains the keying information from a memory space of a process executed by the endpoint device that is associated with the handshake.

10. An apparatus, comprising:
    one or more network interfaces to communicate with a network;
    a processor coupled to the network interfaces and configured to execute one or more processes; and
    a memory configured to store a process executable by the processor, the process when executed configured to:
        obtain, from a monitoring agent executed by an endpoint device, keying information for an encrypted traffic session between the endpoint device and a remote entity, wherein the keying information a) comprises encryption keys exchanged between the endpoint device and the remote entity and b) is obtained, after the encrypted traffic session is formed, by the monitoring agent from a memory space of the endpoint device;
        provide a notification to the monitoring agent that acknowledges receipt of the keying information, wherein transmission of packets via the encrypted traffic session by the endpoint is delayed;

delay transmission of packets via the encrypted traffic session by the endpoint device until the monitoring agent receives the notification that acknowledges receipt of the keying information by the process dropping the packets and relying on transmission control protocol retransmission to recover the packets;

use the keying information to decrypt encrypted traffic from the encrypted traffic session;

apply, based on the decrypted traffic comprising a file from the session, a policy to the encrypted traffic session between the endpoint device and the remote entity to determine whether the decrypted traffic is malicious or against a policy; and perform a mitigation action in response to a determination that the decrypted traffic is malicious or against the policy.

11. The apparatus as in claim 10, wherein the encrypted traffic session is a Transport Layer Security (TLS) session.

12. The apparatus as in claim 10, wherein the apparatus is a firewall or intrusion detection system.

13. The apparatus as in claim 10, wherein the policy comprises a security policy or a data privacy policy.

14. The apparatus as in claim 10, wherein the transmission of packets via the encrypted traffic session by the endpoint device is further delayed by the monitoring agent until the monitoring agent receives the notification that acknowledges receipt of the keying information.

15. The apparatus as in claim 10, wherein the process when executed is further configured to:

block all encrypted traffic associated with the endpoint device for which the apparatus did not receive keying information from the monitoring agent.

16. The apparatus as in claim 10, wherein the mitigation action comprises at least one of: blocking the encrypted traffic session, rerouting the encrypted traffic session, and generating an alert.

17. The apparatus as in claim 10, wherein the monitoring agent uses its root-level privileges at the endpoint device to access the memory space of the endpoint device.

18. The apparatus as in claim 17, wherein the monitoring agent detects a handshake between the endpoint device and the remote entity that forms the encrypted traffic session, and the monitoring agent obtains the keying information from a memory space of a process executed by the endpoint device that is associated with the handshake.

19. A tangible, non-transitory, computer-readable medium storing program instructions that cause a device to execute a process comprising:

obtaining, by the device and from a monitoring agent executed by an endpoint device, keying information for an encrypted traffic session between the endpoint device and a remote entity, wherein the keying information a) comprises encryption keys exchanged between the endpoint device and the remote entity and b) is obtained, after the encrypted traffic session is formed, by the monitoring agent from a memory space of the endpoint device, and wherein the device is an intermediary device that executes a traffic inspection service;

providing, by the device, a notification to the monitoring agent that acknowledges receipt of the keying information, wherein transmission of packets via the encrypted traffic session by the endpoint is delayed by the traffic inspection service dropping the packets and relying on transmission control protocol retransmission to recover the packets;

delaying, by the device, transmission of packets via the encrypted traffic session by the endpoint device until the monitoring agent receives the notification that acknowledges receipt of the keying information;

using, by the device, the keying information to decrypt encrypted traffic from the encrypted traffic session;

applying, by the device and based on the decrypted traffic comprising a file from the session, a policy to the encrypted traffic session between the endpoint device and the remote entity to determine whether the decrypted traffic is malicious or against a policy; and performing, by the device, a mitigation action in response to a determination that the decrypted traffic is malicious or against the policy.

20. The computer-readable medium as in claim 19, wherein the transmission of packets via the encrypted traffic session by the endpoint device is further delayed by the monitoring agent until the monitoring agent receives the notification that acknowledges receipt of the keying information.

* * * * *